United States Patent [19]

Mansfield et al.

[11] Patent Number: 4,826,288

[45] Date of Patent: May 2, 1989

[54] METHOD FOR FABRICATING OPTICAL FIBERS HAVING CORES WITH HIGH RARE EARTH CONTENT

[75] Inventors: Robert J. Mansfield, Stow; Bill C. McCollum, Marlborough; Richard P. Tumminelli, Ashland, all of Mass.

[73] Assignee: Polaroid Corporation, Patent Department, Cambridge, Mass.

[21] Appl. No.: 36,505

[22] Filed: Apr. 9, 1987

[51] Int. Cl.⁴ .................. G02B 6/16; C03B 37/018
[52] U.S. Cl. ........................... 350/320; 65/3.12; 350/96.29; 350/96.34
[58] Field of Search ............... 350/96.29, 96.30, 96.34, 350/320; 65/3.12; 427/163

[56] References Cited

U.S. PATENT DOCUMENTS

| | | | |
|---|---|---|---|
| 4,015,217 | 3/1977 | Snitzer | 350/96.1 X |
| 4,455,741 | 6/1984 | Kolodner | 356/43 X |
| 4,504,299 | 3/1985 | MacChesney et al. | 65/3.12 |
| 4,616,901 | 10/1986 | MacChesney et al. | 350/96.34 |
| 4,666,247 | 5/1987 | MacChesney et al. | 350/96.34 |
| 4,675,300 | 6/1987 | Zare et al. | 356/318 X |
| 4,708,494 | 11/1987 | Kleinerman | 250/231 R X |

FOREIGN PATENT DOCUMENTS 86-07348 12/1986 PCT Int'l Appl. .

Primary Examiner—John D. Lee
Attorney, Agent, or Firm—Francis J. Caufield

[57] ABSTRACT

A chemical vapor deposition method which utilizes a rare earth chelate vapor as a source of rare earth ions for producing an optical fiber having a core with a high rare earth content.

7 Claims, 1 Drawing Sheet

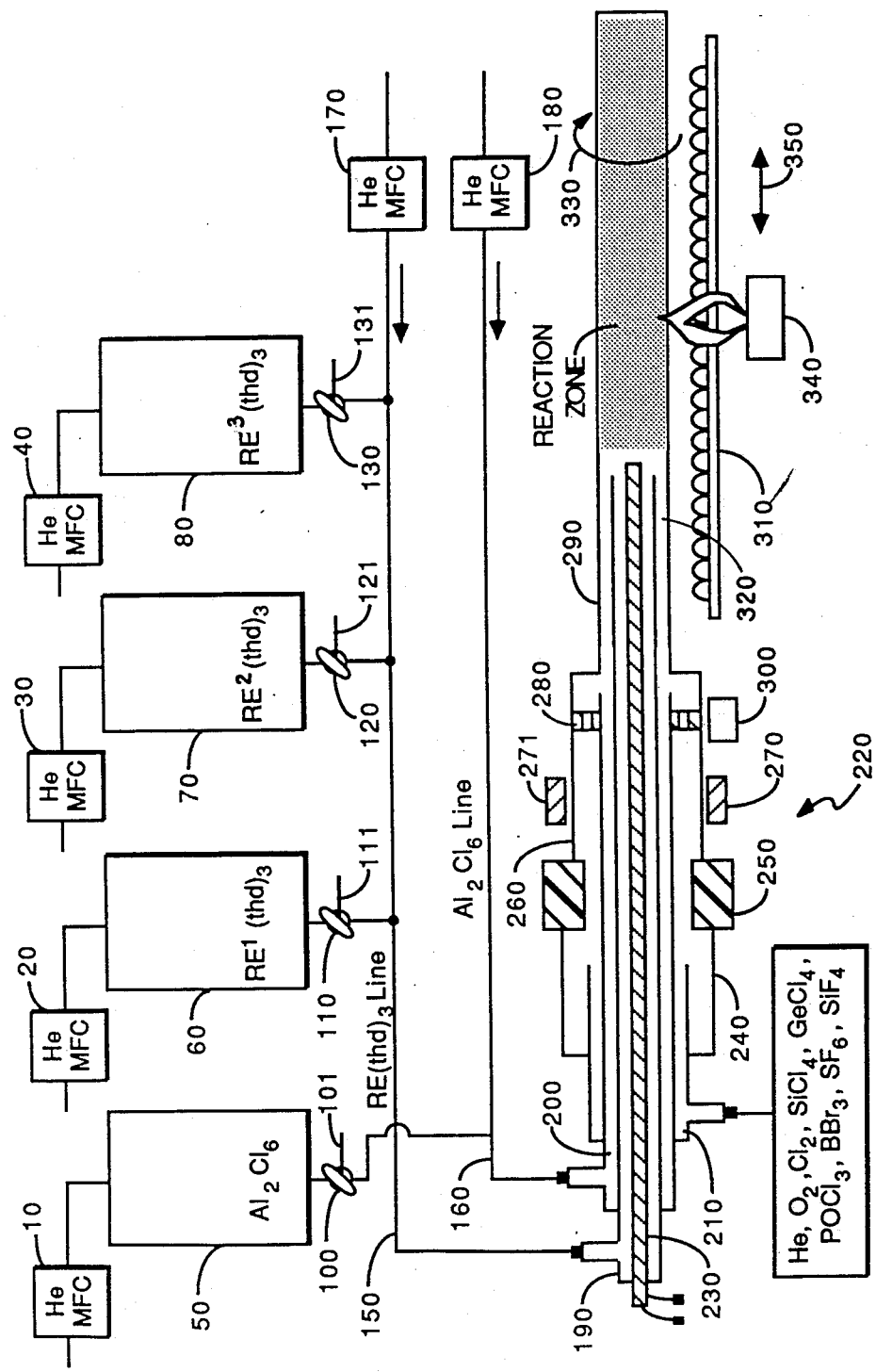

METHOD FOR FABRICATING OPTICAL FIBERS HAVING CORES WITH HIGH RARE EARTH CONTENT

TECHNICAL FIELD OF THE INVENTION

The present invention relates to a method for fabricating optical fibers and, in particular, to a method for fabricating optical fibers having cores with high rare earth content.

It has long been of interest in the art to fabricate optical fibers having cores which contain various rare earth ions such as $Nd^{3+}$. A number of prior art methods have been tried but they have had limited success in producing fibers having cores with high rare earth content and, as a result, the performance of these fibers has been limited. In one prior art method, referred to as a "rod-in-tube" method with soft glasses, a rod containing a rare earth compound is placed inside a tube of an appropriate glass. The combination is then drawn into a fiber whose core contains the rare earth ion.

In a further prior art method, a porous glass is soaked in a solution of a rare earth compound, dried, and then drawn into a fiber. This method has resulted in rare earth contents in the core of only approximately 1000 ppm.

In yet a still further prior art method, rare earth chlorides in the vapor phase are used as a source for rare earth ions in a chemical vapor deposition process. In addition to the fact that this method has not yet been able to achieve substantial rare earth content in optical fiber cores, it suffers from the additional problem of controlling the high temperatures, of the order of 1000° C., which are required to maintain rare earth chlorides in the gas phase. Further, there appears to be a thermodynamic limitation on the formation of rare earth oxides from rare earth chlorides (and perhaps bromides) in the useful reaction temperature range of 1700° K.–2100° K. This method has resulted in rare earth contents in the core of approximately 2000 ppm.

As a result, there exists a need in the art for a method for fabricating optical fibers having cores with high rare earth content.

SUMMARY OF THE INVENTION

Embodiments of the present invention provide methods employing chemical vapor deposition for fabricating $SiO_2$ glass clad optical fibers having high silica content glass cores with high rare earth content.

In the inventive method, volatile metal organic chelates serve as sources for rare earth ions. Such metal organic chelates include $Y^{3+}$ chelates and $M^{3+}$ ligands such as: 1,1,1,2,2,3,3-heptafluoro-7,7-dimethyl-4,6-octanedione; 2,2,6,6-tetramethyl-3,5,-heptanedione; 1,1,1-trifluoro-5,5,-dimethyl-2,4-hexanedione; acetylacetone, trifluoroacetylacetone; hexafluroacetylacetone; and dipivaloylmethane. Of these, the most volatile and most thermally stable vapor species are $M^{3+}$ complexes of: 1,1,1,2,2,3,3-heptafluoro-7,7-dimethyl-4,6-octanedione and 2,2,6,6-tetramethyl-3,5-heptanedione, referred to hereinafter as $(thd)_3$. For the neodymium case for the former ligand, considerable decomposition of the compound was found to occur at temperatures appropriate to provide adequate vapor pressures. As a result, we prefer to use the compounds designated as $M(thd)_3$ because of good volatility and good thermal stability of the solid and vapor species. The volatility is important in providing the compound in the vapor phase at reasonably low temperatures and the stability is important in transporting the compound to a reaction zone in a chemical vapor deposition apparatus. In the accordance with the inventive method, these species are delivered on a controlled basis into a conventional chemical vapor deposition (CVD) reactor via a carrier gas, preferably helium, by means of mass flow controllers.

Columns are provided in the apparatus used to practice the inventive method to provide a source of the species in vapor form. The columns are packed with the species or are packed with a mixture of the species and an inert, nonvolatile granulated solid such as high purity $SiO_2$ or $Al_2O_3$. The columns are maintained at a constant temperature to produce a controlled vapor pressure of the species as a carrier gas is passed therethrough, the value of temperature typically depending on the particular rare earth species being used. As a result, a vapor pressure of the gaseous species is formed which is characteristic of the particular species at a given temperature.

All surfaces of the reactant delivery system and the CVD reactor which are downstream from the column are maintained at temperatures which are high enough to prevent condensation of the vapor species but which are not so high as to produce premature decomposition thereof.

The core of the optical fiber is formed by chemical vapor deposition of component oxides on the walls of a quartz glass surface which, in this case, are the walls of the inside of a quartz tube. The reaction of components such as $SiCl_4$, $Al_2Cl_6$, and $M(thd)_3$ in oxygen, all in a carrier of, for example, helium, takes place in the heated, rotating quartz tube with, for example, heating being provided by a traversing hydrogen-oxygen torch. After the core layer is deposited, the tube is collapsed to form a rod having a core containing rare earth ions. The rare earth chelates which arrive in the reaction zone as a vapor react with the oxygen and other components to form a rare earth oxide and other nonvolatile glass constituents such as $Al_2O_3$ and $SiO_2$ and other volatile compounds. These volatile compounds are themselves not incorporated into the glass but are exhausted from the system. The nonvolatile component oxide mixture is then fused to form a glass layer containing one or more rare earth elements.

One particular advantage of the inventive method is that a number of different rare earth chelate complexes can be transported with good compositional control to the reaction zone of the CVD apparatus at the same time for simultaneous incorporation into the core of an optical fiber. For example, this may be accomplished by utilizing several individual source columns, each of which produces a vapor rare earth chelate for transmission into the transport stream. Thus, in accordance with the inventive method, we have fabricated optical fibers having cores which contain as many as three different rare earth ions.

A further advantage of the inventive method is that relatively low temperatures, i.e., temperatures in the range of approximately 200° C. at most, may be used to maintain adequate concentrations of the rare earth chelates in the vapor phase for transport into the CVD reactor. This substantially reduces control problems associated with prior art methods which utilize rare earth chlorides.

A further embodiment of the inventive method provides for introducing aluminum ions into fiber cores. The aluminum ions are introduced into the CVD reaction zone by means of aluminum chloride vapor, i.e., $AlCl_3$ or $Al_2Cl_6$. The aluminum serves several purposes: (1) it increases rare earth ion solubility in the glass core; (2) it raises the index of refraction of the core to provide waveguiding; and (3) when used with $Nd3+$, it causes the $Nd3+$ to lase at approximately 1.064 microns, which wavelength is compatible with the wavelength of $YAG-Nd3+$ crystalline lasers.

The preferred concentrations of materials in the glass core are: 2-20 wt% of $Al_2O_3$, 0.1-4 wt% of $Nd_2O_3$; and the remainder of the core being primarily $SiO_2$ glass. We have also made fibers having cores with $Yb3+$ and $Er3+$ ions, the total rare earth oxide concentration being in excess of 5 wt%. In these fabrications we have used solid rare earth chelate compounds as a source in the source columns of the CVD reactor apparatus. It should be noted that other oxides such as $P_2O_5$ and $GeO_2$ may be added to the core to adjust its properties. As a result of our use of the inventive method we believe that with solid source columns, optical fiber cores with rare earth contents in the approximate range between 0.1 to 10 wt%, or higher, are achievable with the limit being determined by solubility considerations.

BRIEF DESCRIPTION OF THE DRAWING

A complete understanding of the present invention may be gained by considering the following detailed description in conjunction with the accompanying drawing in which FIG. 1 shows, in pictorial form, an illustrative chemical vapor deposition apparatus used to practice the present invention.

DETAILED DESCRIPTION

FIG. 1 shows, in pictorial form, a chemical vapor deposition apparatus used to practice one embodiment of the inventive method for forming an optical fiber having a core with a high rare earth content. The apparatus of FIG. 1 also can produce a fiber having a core in which several different rare earth compounds are contained.

As shown in FIG. 1, a carrier gas, helium in the embodiment described here, is injected from a source, not shown, through mass flow controllers MFC 10, MFC 20, MFC 30 and MFC 40 into columns 50, 60, 70, and 80, respectively. Mass flow controllers are electronic equipment which are well known in the art. Columns 50, 60, 70 and 80 serve as sources of various vapors. In the embodiment described herein, column 50 is a source of $Al_2Cl_6$ vapor; column 60 is a source of a rare earth chelate vapor, for example, $Nd(thd)_3$, which is designated in a specific example as R.E.[1](thd)$_3$; and columns 70 and 80 are sources of other rare earth chelates which are designated in a specific example as R.E.[2](thd)$_3$ and R.E.[3](thd)$_3$, respectively. Although we are describing the inventive method specifically in terms of rare earth compounds formed with the chelate ligand (thd)$_3$, the inventive method encompasses the use of rare earth organic chelates in general and, in particular, the following ligands: 1,1,1,2,2,3,3-heptafluoro-7,7-dimethyl-4,6- octanedione; 2,2,6,6-tetramethyl-3,5, -heptanedione; 1,1,1-trifluoro-5,5, - dimethyl-2,4-hexanedione; acetylacetone; trifluoroacetylacetone; hexafluroacetylacetone; and dipivaloylmethane.

The method of providing $Al_2Cl_6$ vapor is well known in the art. One method for providing a rare earth chelate vapor as output from a column entails the following: mixing a granulated solid form of the rare earth chelate with an inert, nonvolatile granulated solid such as high purity $SiO_2$ or $Al_2O_3$, heating the mixture at a constant temperature and passing a controlled amount of a carrier gas, for example helium, through the mixture to produce a predetermined vapor pressure of the rare earth chelate. The amount of rare earth chelate produced in vapor form depends on the surface area and temperature of the active granulated solid --we prefer to use the inert granulated solid because it provides a support matrix for the rare earth chelate, reduces channeling effects, maximizes exposed surface area to provide saturation of the vapor, and tends to prevent coalescence of rare earth chelate particles so as to maximize their surface area. Note that the particular value of the temperature used depends on the particular rare earth chelate used. In one particular example, the column we have used as the source of rare earth chelate vapor comprised a glass column having a diameter of approximately 1.5 inches which was surrounded by aluminum pipe with a silicone rubber mate enmeshed with heater wire. The high thermal conductivity of the aluminium pipe (approx. 1/16-⅛ inch wall) served to minimize thermal gradients along the column. By using a platinum RTD sensing element, the column temperature at the sensing element can be set reliably controlled to within +/−0.1° C. In a preferred embodiment, we have used $Nd(thd)_3$ powder diluted with high purity $SiO_2$.

Columns 60, 70 and 80 preferably are heated to a maximum temperature in the area of 200° C. Of course, as discussed above, different temperatures are used for different rare earth chelates as a result of the differences in vapor pressure for each of the different compounds.

As shown in FIG. 1, vapor material exits each of columns 50, 60, 70 and 80 through 3-way stopcocks 100, 110, 120, and 130, respectively. These stopcocks have vents 101, 111, 121, and 131, respectively, for venting the rare earth chelate vapors as the column is brought to a desired equilibrium gas flow and temperature condition prior to diversion of the chelate vapor stream into the transport line leading to the CVD reactor. The stopcocks divert the He and R.E.$^n$ chelate vapor stream into the reactor system only when deposition of the rare earth containing glass layer begins, and serve to shut off the R.E. chelate vapor supply at the end of the required deposition. As shown in FIG. 1, the exits from columns 60, 70 and 80, each of which columns serves as a source of a rare earth chelate vapor, are connected to the same transport line, i.e., transport line 150, whereas, the $Al_2Cl_6$ vapor which exits from column 50 enters transport line 160. The vapor materials which enter transport lines 150 and 160 are transported therein by a carrier gas, for example, helium, which enters the transport lines through MFC 170 and MFC 180, respectively (The source of the helium carrier is not shown). Such transport lines are well known in the art. For example, transport lines 150 and 160 are teflon ¼ "diameter lines which are surrounded by a 1 and ⅛" copper tube. The temperature of transport lines 150 and 160 is maintained at a temperature which is sufficiently high that the vapor materials being transported do not crystallize therein. For example, with a compound such as $Nd(thd)_3$, we have used temperatures in the range of 210° C. to 225° C. In one particular embodiment, we have used a thermocouple temperature sensor, which is well known in the art, to control the temperature in transport lines 150 and 160 to within 2° to 3° C. This provides sufficient accuracy to control the temperature and vapor pressure of the vapor materials contained therein to ensure stability. Note that the aluminum and rare earth compounds have not been in contact at this point.

Transport lines 150 and 160 exit into concentric, chambers 190 and 200 of reaction equipment 220, respectively, which chambers 190 and 200 are separate from each other. A mixture of unheated gases from a source which is not shown enters chamber 210, which chamber 210 is concentric with and separate from chambers 190 and 200. For example, in one embodiment of the inventive method, the mixture of gases comprises He, $O_2$, $Cl_2$, $SiCl_4$, $GeCl_4$, $POCl_3$, and $BBr_3$. These gases can be inserted into chamber 210 in a mixture because they will not react at the temperature thereof. Heating element 230 is axially disposed in reaction equipment 220. As shown in FIG. 1, heating element 230 comprises a nichrome wire wrapped on a small bore alumina tube. Note that due to the placement of chambers 190, 200 and 210, the temperature in innermost chamber 190 is highest and the temperature in outermost chamber 210 is lowest among chambers 190, 200, and 210.

Chambers 190, 200 and 210 are fitted into a seal comprised of two parts, non-rotating section 240 and rotating section 250, rotating section 250 comprises a gas tight seal. As shown in FIG. 1, chambers 190, 200 and 210 exit into further chambers which are disposed in quartz tube 260, quartz tube 260 being held in centering element 280 and gripped in lathe chuck 270 and 271. As a result, the lathe to which lathe chuck 270 and 271 is affixed, not shown, rotates the parts of reaction equipment 220 which are shown in FIG. 1 as being to the right of non-rotating section 240.

As a point of clarification, the nonrotating (240) and rotating (250) parts of the seal are affixed to the outer quartz wall of chamber 210, and the outer quartz wall of the rotating 38 mm O.D. quartz tube (260) respectively, by an arrangement of O-ring seals. Note that quartz tube 290, which serves as the CVD reaction tube, at a point just beyond the teflon centering element 280. Tube sections 260 and 290 are rotated by the lathe. The lathe chucks attached to the other end of reaction tube 290 are not shown. Finally, as all the vapors exit the chambers contained in quartz tube 260 and enter the reaction zone in quartz tube 290, they pass by heating lamp 300.

The reaction zone in quartz tube 290 is heated by ribbon burner 310. Ribbon burner 310 comprises a quartz tube having a slit. $H_2$ is injected therein and ignited to provide a flame which heats quartz tube 290 in region 320 to a few hundred ° C. In one particular embodiment of the inventive method we have used a quartz tube 290 which has a 20 mm OD and a 16 mm ID in the reaction zone. Traversing $H_2/O_2$ burner 340 is advanced axially in the direction shown by arrow 350 along the extent of the reaction zone of quartz tube 290 from a position, as shown in FIG. 1, as far left as approximately 2" to the right end of heating element 230. Note that all the vapors mix in quartz tube 290 at a point at the end of heating element 230. The rare earth chelate vapors are the last to be added to the reaction components at the termination of quartz chamber 190 at a point about 114 inches prior to the end of heating element 230. Further, as shown by arrows 340 and 350, burner 340 travels axially along the reaction zone of quartz tube 290 while quartz tube 290 itself rotates about its axis in the direction shown by arrow 330.

Because we have used rare earth chelates in accordance with the inventive method, we have been able to limit the delivery temperature of the various gaseous components to the reaction zone to under approximately 250° C. As a result, we have been able to fabricate reaction equipment 220 by using O-rings in rotating seal 250 and at various connector points thereof. Thus, the use of the rare earth chelates provides a major advantage over the use of other materials as a source of rare earth ions which require substantially higher temperatures to maintain gaseous form. For example, rare earth chlorides require transport temperatures in the range of 1000° C. to 1500° C.

Once the gases species are mixed together in the reaction zone of quartz tube 290, chemical reactions occur as the reactant vapors pass through the hot zone provided by the traversing $H_2/O_2$ burner. Rare earth oxides are among the products, along with other non-volatile oxides which become mixed in a soot layer which forms on the wall of quartz tube 290 downstream of the traversing burner. These components are fused into a homogeneous glass layer as the burner passes over them. The chelate ligands advantageously form gaseous compounds such as $CO_2$ and $H_2O$ which are exhausted from quartz tube 290.

Use of an aluminum compound in the described embodiment of the inventive method provides a preferred embodiment because aluminum serves two purposes. First, it is used to provide the difference in the index of refraction between the core and cladding of the resultant optical fiber to provide guiding of light waves. For example, 1 wt % of aluminum in silicate glass provides an index of refraction difference of approximately 0.1. Second, the aluminum enhances the solubility of the rare earth compounds in the glass without phase separation, i.e., without crystallization of other compounds in the glass phase as it cools.

The specific details of supplemental portions of the above-described chemical vapor deposition portion of the inventive method are well known to those of ordinary skill in the art. For example the following, including without limitation, are well known: how an optical fiber is formed from quartz tube 290; that dopants other than aluminum can be used to change the index of refraction of the core of the optical fiber relative to the index of refraction of the cladding; that carrier gases other than helium can be used to transport the vapors; appropriate ranges of temperatures for the reaction zone; that oxygen bearing compounds may replace oxygen in whole or in part for use in the reaction zone; and so forth.

Clearly, those skilled in the art recognize that further embodiments of the present invention may be made without departing from its teachings. Therefore, it is intended that all matter contained in the above description or shown in the accompanying drawings shall be interpreted as illustrative and not limiting.

What is claimed is:

1. A method for fabricating an optical fiber with a core of high rare earth content for use in a solid state laser, said method comprising the steps of:
   forming a first vapor comprising at least one rare earth organic chelate species where said organic chelate species is derived from a nonfluorinated β-diketone ligand;

forming a second vapor, initially isolated from said first vapor, of at least one unreacted compound containing a glass forming element and oxygen;

forming a third vapor comprising an aluminium compound for depositing aluminium ions;

entraining said first, second, and third vapors in a carrier gas and flowing them toward a chemical vapor deposition reaction zone; and mixing said first, second, and third vapors with one another just prior to entry into said reaction zone.

2. The method of claim 1 wherein the step of forming said first vapor comprises the step of heating a mixture of a solid of said at least one rare earth chelate species with $SiCl_4$ and exposing the heated mixture to a carrier gas.

3. The method of claim 1 wherein said carrier gas is helium.

4. The method of claim 1 wherein said nonfluorinated $\beta$-diketone is 2,2,6,6-tetramethyl-3,5, -heptanedione.

5. A method for fabricating an optical fiber with a core of high rare earth content for use in a solid state laser, said method comprising the steps of:

forming a first vapor comprising at least one rare earth organic chelate species where said organic chelate species is derived from a nonfluorinated $\beta$-diketone ligand;

forming a second vapor, initially isolated from said first vapor, of at least one unreacted compound containing a glass forming element and oxygen;

forming a third vapor comprising an aluminium compound for depositing aluminium ions;

entraining said first, second, and third vapors in a carrier gas and flowing them toward a chemical vapor deposition reaction zone wherein the reaction zone is defined by the inner walls of a quartz tube;

mixing said first, second, and third vapors with one another just prior to entry into said reaction zone, and transporting another vapor comprising $O_2$ and $SiO_2$ and at least one other compound selected from the group comprising $Cl_2$, $GeCl_4$, $POCl_3$, $SF_6$, and $SiF_4$ to the reaction zone for deposition of the core.

6. A method for fabricating optical fibers having cores with rare earth contents of at least one-half weight percent, said method comprising the steps of:

vaporizing at least one nonfluorinated $\beta$-diketone ligand to form a first vapor of a rare earth chelate species to serve as the source for the rare earth content of the fiber core;

forming a second vapor, initially isolated from said first vapor, of at least one unreacted compound containing a glass forming element and oxygen;

entraining said first and second vapors in a carrier gas and flowing them toward a chemical vapor deposition reaction zone;

mixing said first and second vapors with one another just prior to entry into said reaction zone, and reacting said first and second vapors in said reaction zone to form a glass of silicon dioxide and at least one rare earth oxide whose concentration in said glass is at least one-half percent by weight.

7. The method of claim 6 wherein said nonfluorinated $\beta$-diketone is 2,2,6,6-tetramethyl-3,5, -heptanedione.

* * * * *